Nov. 10, 1964  J. W. McDUFFIE  3,156,346
HAY BALER
Filed Jan. 15, 1963
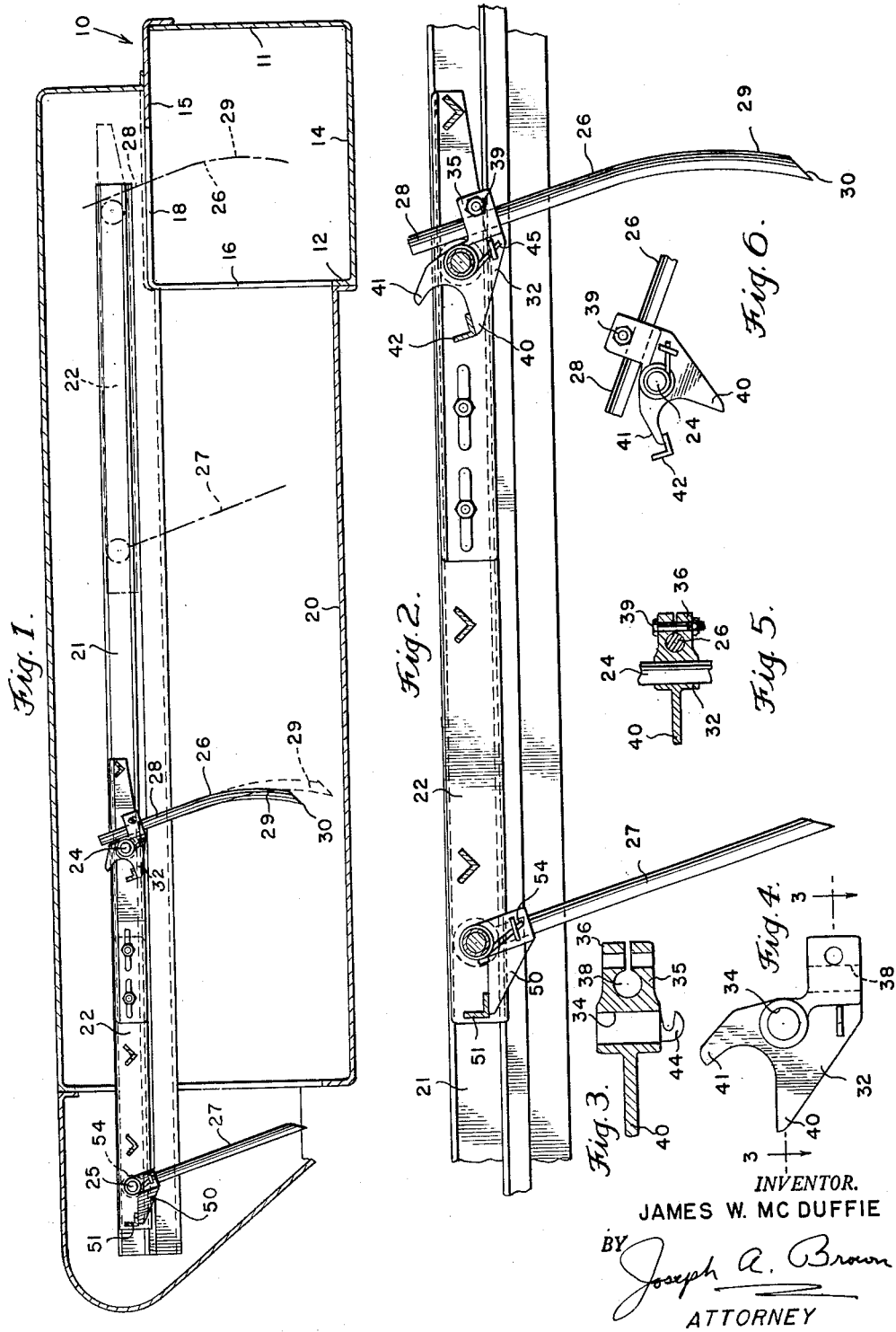
INVENTOR.
JAMES W. MC DUFFIE
BY Joseph A. Brown
ATTORNEY : 3,156,346
HAY BALER
James W. McDuffie, New Holland, Pa., assignor to Sperry Rand Corporation, New Holland, Pa., a corporation of Delaware
Filed Jan. 15, 1963, Ser. No. 251,637
5 Claims. (Cl. 198—223)

This invention relates generally to hay balers. More specifically, the invention relates to improvements in the feeder mechanism shown and described in U.S. Patent No. 3,068,784, issued December 18, 1962.

The feeder in the designated patent comprises a carriage reciprocal in a straight line transverse to a bale case. Spaced sets of feed fingers depending from the carriage engage hay on a feed platform and convey the hay through an opening in the side wall of the bale case. The top of the bale case is slotted to receive a leading set of fingers on the carriage. Reciprocation of the carriage is in precise timed relation with a plunger operative in the bale case so that the feed fingers may enter and leave the case between successive working strokes of the plunger.

To facilitate conveyance of hay into the bale case and to direct the material to the upper outer corner of the case remote from the infeed opening, it has been practiced to mount straight fingers at an angle relative to vertical and inclined downwardly from the feeder carriage and toward the bale case. Such fingers enter and leave the bale case in timed relation with the baler plunger. It is essential that the timing be maintained to preclude interference of the moving components. Particularly, the lower ends of the feed fingers which enter the bale case first and leave last must travel so as to provide proper clearance with the baler plunger.

When the material to be baled is heavy such as pangola grass, lush alfalfa and the like, the feed fingers may be substantially vertically spaced from the feed platform of the baler and efficient feeding will nevertheless result. However, in some light materials such as oats hay, the closer the fingers are to the feed platform, the better the infeed of material. Heretofore, the spacing between the feed fingers and the feed platform has been fixed at that point best suited for most baling conditions, consistent with proper timing and clearance with the plunger of the baler.

One object of this invention is to provide, in a baler feeder of the character described, means for mounting feed fingers whereby the fingers may be selectively positioned and adjusted to achieve optimum feeding results, depending upon the particular crop to be handled.

Another object of this invention is to provide, in a hay baler feeder of the character described, fingers which are of such configuration that the crop material harvested is properly distributed throughout the bale case of the baler when delivered thereto.

Another object of this invention is to provide a feed finger configuration which provides a better operating relation between the baler plunger and the feed fingers.

A further object of this invention is to provide feed fingers which are mounted for pivotal movement about an axis transverse to the direction of feed, the pivoting of the fingers being limited in two directions.

A still further object of this invention is to provide a finger mounting means which is simply designed and of low cost, being easy to use and adjust.

Other objects of this invention will be apparent hereinafter from the specification and from the recital in the appended claims.

In the drawing:

FIG. 1 is a transverse section through the feeder mechanism of a hay baler, such feeder having feed fingers constructed and mounted according to this invention;

FIG. 2 is an enlarged side elevation of the carriage portion of the feeder;

FIG. 3 is an enlarged section of the finger mounting means employed in this invention, such section being taken on the lines 3—3 of FIG. 4 looking in the direction of the arrows;

FIG. 4 is a side elevation of FIG. 3;

FIG. 5 is a horizontal fragmentary section through the mounting means for one of the fingers shown in FIG. 2; and FIG. 6 is a view showing the finger mounting means pivoted in a counterclockwise direction from the position shown in FIG. 2.

Referring now to the drawing by numerals of reference, and particularly to FIG. 1, 10 denotes a baler bale case having upright side walls 11 and 12, a bottom wall 14 and a top wall 15. Side wall 12 is provided with an infeed opening 16 and top wall 15 is slotted at 18, such slot communicating with opening 16. Extending laterally from bale case 10 is a feed platform 20 which registers with the lower portion of opening 16. The crop material to be harvested is picked up by a conventional pick up mechanism, not shown, and deposited on platform 20 for transverse conveyance through the opening 16 and into the bale case 10. A plunger, not shown, reciprocal in the bale case compresses the crop material into bales. Such pick-up and plunger structure may be similar to that shown in Pat. No. 3,068,784.

For conveying the crop material, a track 21 is provided above platform 20 and bale case 10. Track 21 extends transverse to the bale case and parallel to platform 20. A carriage 22 is supported on track 21 for movement thereover toward and away from the bale case 10 from the solid line position shown in FIG. 1 to the dotted line position. Carriage 22 has a transverse shaft 24 at the end toward bale case 10 and a shaft 25 at the end remote from the bale case. Shaft 24 carries a pair of feed fingers one of which is shown at 26 and shaft 25 carries a pair of feed fingers one of which is shown at 27. When the feeder carriage is at the end of a working stroke, FIG. 1, feed finger 26 projects downwardly through the slot 18 of top wall 15 of the bale case.

Finger 26 has a straight upper section 28 which extends downwardly at an incline toward the bale case 10, when the finger is operating to convey crop material toward bale case 10. The finger also has a lower section 29 which extends generally vertically, being curved however so that an intermediate portion of the finger is closer to the bale case than the lower finger end 30. When finger 26 enters the bale case 10, the inclined portion 28 directs material toward the upper corner of the bale case formed by top wall 15 and side wall 11, while the curved portion 29 of the feed finger directs material toward wall 11. This insures that the crop material is distributed transversely of the bale case and that the bale subsequently formed will have a proper box-like shape.

Finger 26 is supported on a one piece casting 32 having a transverse bore 34 which receives shaft 24. Ears 35 projecting transversely of bore 34 provide a clamp 36 whereby the diameter of an opening 38 for finger 26 may be varied. A bolt 39 projects through ears 35 and provides means for locking finger 26 to the mounting 32. When finger 26 is released on loosening of bolt 39, it may be adjusted relative to the mounting. Depending upon the particular crop material being harvested, the finger 26 may be selectively adjusted up or down relative to platform 20 to achieve optimum feeding. When the material being baled is heavy, it is preferable to have the finger 26 adjusted to a position as shown for example in solid lines in FIG. 1. When the material is very light, the lower end 30 of the finger should be positioned closer to platform 20, as shown in the dotted line position. This will insure the material on platform 20 will be swept clean.

Since the upper end of the finger is at an incline, any adjustment of the finger toward platform 20 moves the end 29 of the finger toward bale case 10. This affects the timing with the bale forming plunger. Since that the lower portion of the finger is curved, a timing advantage is obtained since the lower end 30 will enter and leave the bale case 10 at a different timed relation relative to the plunger than would be the case if finger 26 were straight throughout its entire length. The closer the timed relationship between the feed finger and the plunger, the better the bale forming and machine efficiency. The configuration of feed finger shown provides optimum timing.

On movement of carriage 22 toward bale case 10, it is necessary that the feed fingers 26 and 27 stand erect and be held against pivotal movement in a clockwise direction. In like respect, the fingers must be free to pivot in a counterclockwise direction on a retracting stroke of the carriage so that the fingers will ride over hay on the platform 20. The mounting 32 for the finger 26 has a pair of angularly spaced stops 40 and 41, both of which are engageable with transverse member 42 of the carriage 22. The stop 40 limits pivotal movement of the finger 26 in a clockwise direction while stop 41 limits pivotal movement of the finger counterclockwise, as shown in FIG. 6. As shown best in FIG. 3, mounting 32 has a hook 44 with which a coil spring 45 is engageable and operative to bias finger 26 in a clockwise direction. Spring 45 is relatively light and capable of returning the finger 26 to proper position at the end of a return stroke, but offering small resistance to pivoting of the finger counterclockwise when the finger engages material on the platform 20 during a retracting stroke. The second stop 41 prevents finger 26 from pivoting beyond a desired point on a retracting stroke of the feeder carriage and the finger is prevented from striking other structure of the feeder. Further, the extension of the finger in one pivotal position is limited whereby the timing between the feed finger 26 and the baler plunger may be precisely established.

When finger 26 is in the position shown in FIG. 6 on a retracting stroke of the feeder, and then the feeder starts the next working stroke, the curved portion 29 of the finger digs into the hay on platform 20 and the finger is pivoted back to starting position. The curvature of the finger facilitates the digging action.

Feed finger 27 has a stop 50 which engages carriage bracket 51. This limits pivoting of the finger in a clockwise direction. The finger is free to pivot counterclockwise against the light resistance of spring 54; a second stop is not required since finger 20 does not enter bale case 10 and travel across the path of the baler plunger.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. In a hay baler, a bale case having a pair of upstanding side walls, a top wall and a bottom wall, one of said side walls having a feed opening and said top wall having a slot communicating with said opening, a hay receiving platform extending laterally from said side wall adjacent a lower portion of said opening, a track mounted above said platform and bale case and extending transverse to the bale case, a carriage mounted on said track for movement toward and away from said bale case, said carriage having a forward end toward said bale case and a rear end remote therefrom, a finger depending from said carriage adjacent said forward end and engageable with hay on said platform, means supporting said finger on said carriage for pivotal movement about a horizontal axis transverse to said track, a pair of angularly spaced stops on said supporting means, one of said stops being engageable with said carriage and limiting pivotal movement of said finger in one direction and the finger being held thereby in a normal pivotal position on a working stroke of said carriage, the other of said stops being engageable with said carriage and limiting pivotal movement of said finger in an opposite direction, spring means biasing said finger to pivot in said one direction, said finger having a straight upper section inclined downwardly and toward said bale case and a curved lower section extending generally vertically when the finger is in said normal position and said lower section being spaced from said platform, a clamp on said supporting means through which said finger upper section extends, means for releasing said clamp whereby said finger may be adjusted relative to said carriage in the direction of the longitudinal axis of the finger upper section to vary the space between the finger lower section and said platform, said finger upper section projecting downwardly through said top wall slot when said carriage is at the end of a working stroke and urging material toward the upper corner of the bale case remote from said one side wall and said finger lower section urging material toward the bale case side wall opposite said one side wall.

2. In a hay baler, a bale case having a pair of upstanding side walls, a top wall and a bottom wall, one of said side walls having a feed opening and said top wall having a slot communicating with said opening, a hay receiving platform extending laterally from said side wall adjacent a lower portion of said opening, a track mounted above said platform and said bale case and extending transverse to the bale case, a carriage mounted on said track for movement on working and return strokes toward and away from said bale case, said carriage having a forward end toward said bale case and a rear end remote therefrom, a finger depending from said carriage adjacent said forward end and engageable with hay on said platform, means supporting said finger on said carriage for pivotal movement about an axis transverse to said track, stop means holding said finger in a normal pivotal position during a working stroke of carriage, said finger having an upper section inclined downwardly and toward said bale case and a lower section extending generally vertically when the finger is in said normal position and said lower section having a free end spaced from said platform, said upper section of the finger projecting downwardly through said top wall slot when said carriage is at the end of a working stroke and urging material toward the upper corner of said bale case remote from said one side wall and said lower section urging material toward the bale case side wall opposite said one side wall.

3. In a hay baler, a bale case having a pair of upstanding side walls, a top wall and a bottom wall, one of said side walls having a feed opening and said top wall having a slot communicating with said opening, a hay receiving platform extending laterally from said side wall adjacent a lower portion of said opening, a track mounted above said platform and said bale case and extending transverse to the bale case, a carriage mounted on said track for movement on working and return strokes toward and away from said bale case, said carriage having a forward end toward said bale case and a rear end remote therefrom, a finger depending from said carriage adjacent said forward end and engageable with hay on said platform, means supporting said finger on said carriage for pivotal movement about an axis transverse to said track, stop means holding said finger in a normal pivotal position during a working stroke of carriage, said finger having an upper section inclined downwardly and toward said bale case and a lower section extending generally vertically when the finger is in said normal position and said lower section having a free end spaced from said platform, said upper section of the finger projecting downwardly through said top wall slot when said carriage is at the end of a working stroke and urging material toward the upper corner of said bale case remote from said one side wall and said lower section urging material toward the bale case side wall opposite said one side wall, and means connecting said finger to said support means for adjustment in a vertical direction relative to said carriage whereby the space between said free end of the lower section of the finger and said platform may be varied.

4. In a hay baler, a bale case having a pair of upstanding side walls, a top wall and a bottom wall, one of said side walls having a feed opening, said top wall having a slot communicating with said opening, a hay receiving platform extending laterally from said side wall adjacent a lower portion of said opening, a track mounted above said platform and said bale case and extending transverse to the bale case, a carriage mounted on said track for movement on working and return strokes toward and away from said bale case, said carriage having a forward end toward said bale case and a rear end remote therefrom, a finger depending from said carriage and engageable with hay on said platform, means supporting said finger on said carriage for pivotal movement about an axis transverse to said track, a pair of angularly spaced stops on said supporting means, one of said stops being engageable with said carriage and limiting pivotal movement of said finger in one direction and maintaining the finger generally vertically when said carriage is moving toward said bale case, the other end of said stops being engageable with said carriage and limiting pivotal movement of said finger in an opposite direction responsive to engagement with hay on said platform when said carriage is moving away from said bale case, and spring means biasing said finger to pivot in said one direction.

5. In a hay baler, a bale case having a pair of side walls, a top wall and a bottom wall, one of said side walls having a feed opening, said top wall having a slot communicating with said opening, a hay receiving platform extending laterally from said side wall adjacent a lower portion of said opening, a track mounted above said platform and said bale case and extending transverse to the bale case, a carriage mounted on said track for movement on working and return strokes toward and away from said bale case, said carriage having a forward end toward said bale case and a rear end remote therefrom, a finger depending from said carriage and engageable with hay on said platform, said finger having a lower free end spaced above said platform, means supporting said finger on said carriage for pivotal movement about an axis transverse to said track, a pair of angularly spaced stops on said supporting means, one of said stops being engageable with said carriage and limiting pivotal movement of said finger in one direction, the other of said stops being engageable with said carriage and limiting pivotal movement of said finger in an opposite direction, spring means biasing said finger to pivot in said one direction, a clamp on said supporting means through which said finger extends, and means for releasing said clamp whereby said finger may be adjusted relative to said carriage to vary the space between the lower free end of the finger and said platform.

References Cited by the Examiner

UNITED STATES PATENTS

| 1,203,135 | 10/16 | Sargent | 198—223 |
| 2,739,519 | 3/56 | Pledger | 172—763 |
| 3,068,784 | 12/62 | McDuffie | 100—142 |

FOREIGN PATENTS 143,712  8/03  Germany.

SAMUEL F. COLEMAN, *Acting Primary Examiner.*
ERNEST A. FALLER, JR., *Examiner.*